United States Patent [19]

Smith et al.

[11] Patent Number: 4,807,713
[45] Date of Patent: Feb. 28, 1989

[54] SUSPENSION SYSTEM FOR TRUCK CABS

[75] Inventors: Russell M. Smith, Overland Park; William J. Peck, Lawrence, both of Kans.

[73] Assignee: Ottawa Truck Corporation, Ottawa, Kans.

[21] Appl. No.: 93,961

[22] Filed: Sep. 8, 1987

[51] Int. Cl.⁴ .................... B62D 27/04; B62D 33/06
[52] U.S. Cl. ............................. 180/89.14; 296/35.1; 280/688
[58] Field of Search ............... 180/89.14, 89.15, 89.16, 180/89.17, 89.18, 89.19; 296/35.1; 280/702, 688, 709

[56] References Cited

U.S. PATENT DOCUMENTS

| | | | |
|---|---|---|---|
| 3,126,975 | 3/1964 | Dafoe | 180/89.15 |
| 3,768,856 | 10/1973 | Stuller | 180/89.15 |
| 3,819,225 | 6/1974 | Carlisle et al. | 180/89.14 |
| 4,033,607 | 7/1977 | Cameron | 280/711 |
| 4,279,321 | 7/1981 | Stone | 180/89.14 |
| 4,294,324 | 10/1981 | Kimball et al. | 180/89.14 |
| 4,496,188 | 1/1985 | Ezell et al. | 180/89.19 |

OTHER PUBLICATIONS

Link Cabmate II Truck Cab Spring Suspension System Advertisement Brochure.

Primary Examiner—Richard A. Bertsch
Attorney, Agent, or Firm—Hovey, Williams, Timmons & Collins

[57] ABSTRACT

A cab suspension system is provided for a yard tractor having tiltable cab with a laterally offset center of gravity which maintains the cab at lateral level, controllably adjusts the longitudinal level, and unlatches and raised the cab in one operation. The system preferably includes a pair of adjustable air sleeve springs disposed between the cab and the tractor frame with one of the springs being larger than the other and disposed on the enter-of-gravity side of the cab; and a hydraulically operable latch coupling the cab with the springs. In use, the configuration of the springs maintains the lateral level of the cab, the tractor driver adjusts the springs' air pressure for longitudinal level, and actuation of the hydraulic system unlatches the cab from the springs and tilts the cab upwardly.

9 Claims, 2 Drawing Sheets

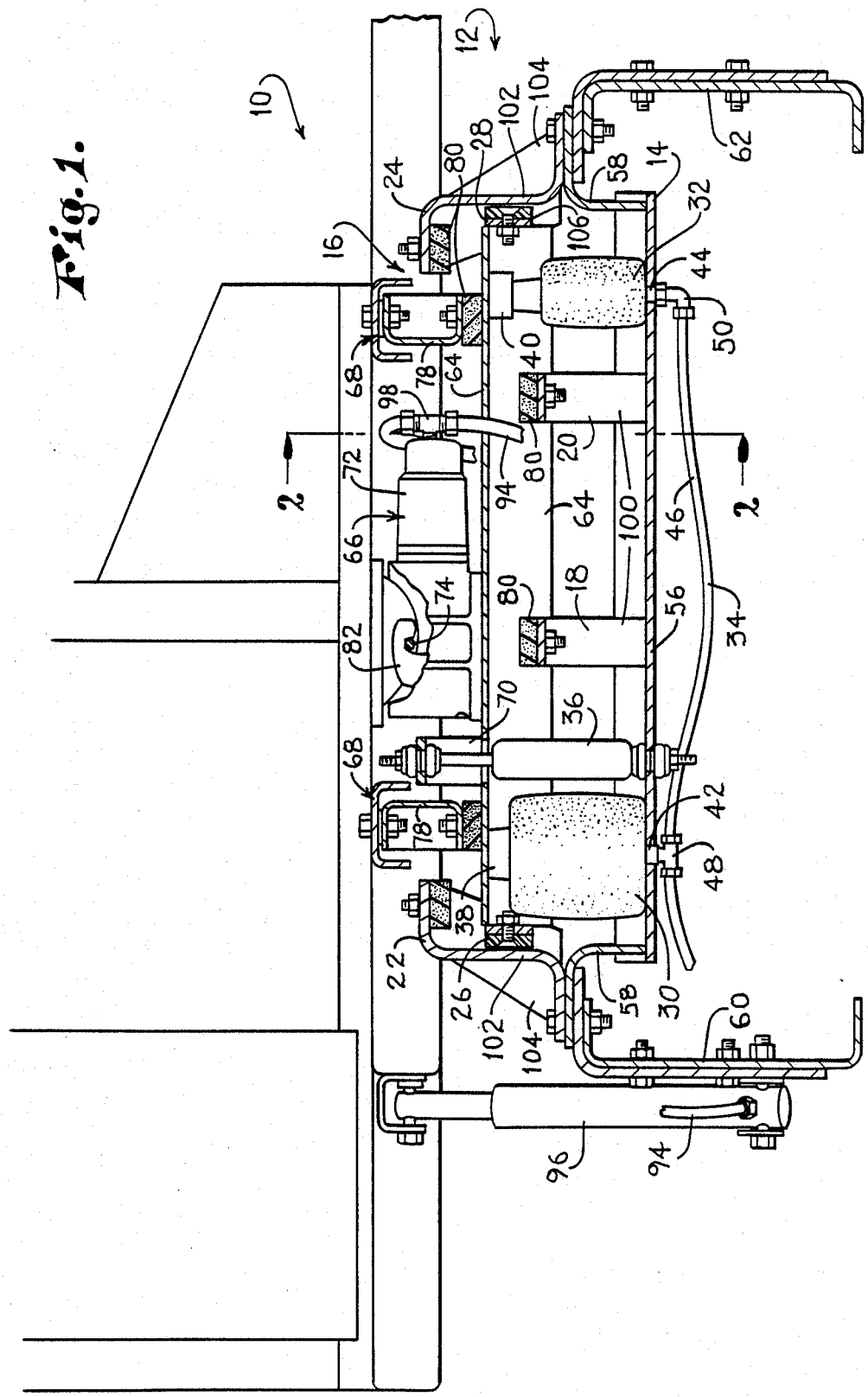

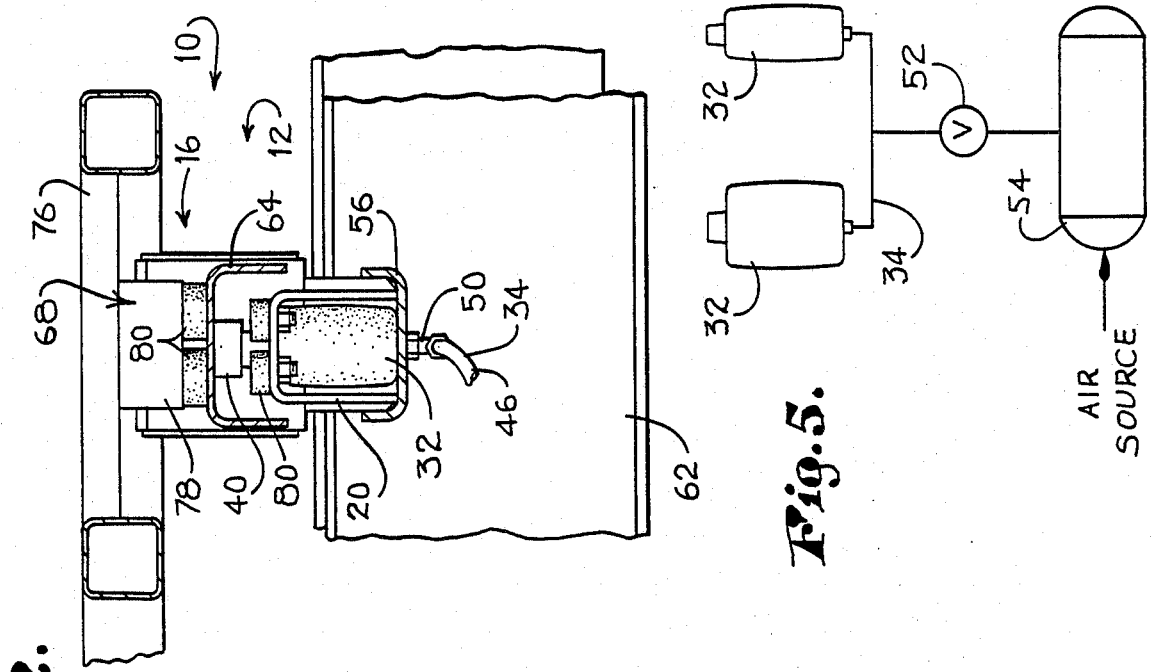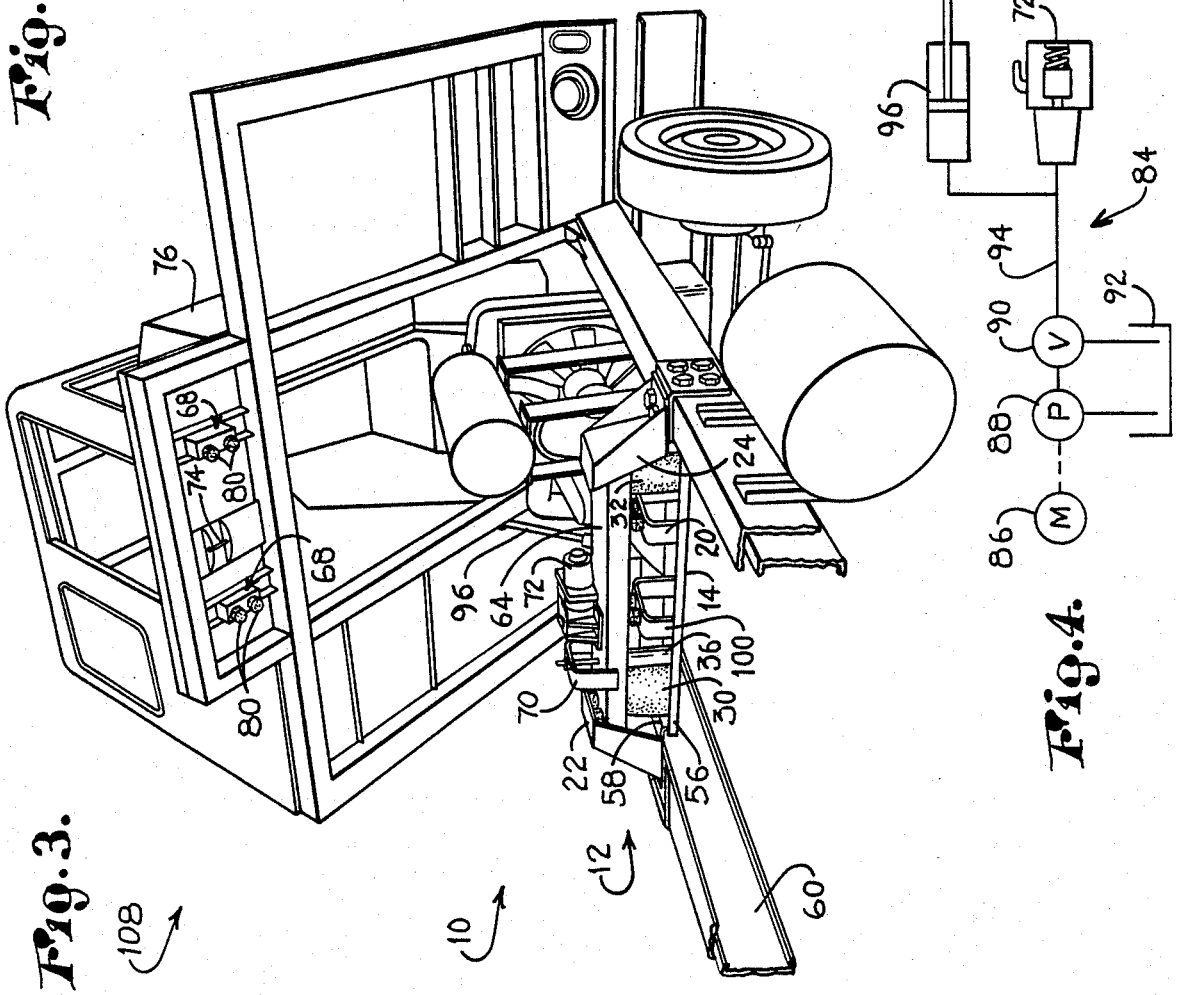

SUSPENSION SYSTEM FOR TRUCK CABS

BACKGROUND OF THE INVENTION

1. Field of the Invention

This invention relates to a suspension system for use in a yard tractor having a tiltable cab hinged at the front in which the cab has an offset center of gravity. More particularly, the invention is concered with a suspension system disposed between the frame of the tractor and the cab at the rearward side of the cab including a pair of air sleeve springs in which one of the springs is larger than the other and disposed on the side of the cab with the center of gravity.

2. Description of the Prior Art

Yard tractors are used for towing semi-trailers in freight yards in order to position the semi-trailers and container chassis for loading and unloading. Normally, yard tractors are not used for "over the road" transport of semi-trailers.

Typically, a yard tractor includes a tiltable cab hinged near the forward end of the cab which is raised to gain access to the engine and lowered by the use of a hydraulic cylinder coupled between the frame and the cab. Because a yard tractor is normally used only for short distances, a typical yard tractor makes provisions for only one person—the driver—and the cab is configured so that the driver's compartment is disposed to either side of the cab. Because of this, the cab has a center of gravity offset from the longitudinal centerline of the cab.

Conventional tiltable yard tractor cabs are coupled directly to the frame of the tractor with little or no provision for resilient suspension between the cab and the frame. As a result, the driver of the cab is subjected to a very uncomfortable ride because freight yards typically have many bumps and potholes.

It is known in the art to provide an air sleeve spring suspension system for over-the-road tractors which have a balanced symmetrical cab—that is, a cab providing for a driver and a passenger. In such prior art systems having tiltable cabs, it is known to provide a pair of air sleeve springs coupled between the rearward side of the cab and the frame in order to provide a more comfortable "cushioned" ride for the occupants of the cab. These prior art systems, however, would be inadequate for a yard tractor because they do not compensate for the offset center of gravity. If such a prior art system were used on a yard tractor having an offset center of gravity, the cab would tilt to one side because of the unbalanced load.

Additionally, known prior art air sleeve suspension systems couple the air sleeve springs to the cab which results in a mechanically complex system requiring manually disconnecting to tilt the cab.

SUMMARY OF THE INVENTION

The problems outlined above are solved by the suspension system for truck cabs as described herein. That is to say, the suspension system ensures a laterally level cab by compensating for the offset center of gravity and provides a mechanically simple system for coupling the cab to the frame.

Broadly, the suspension system comprises a suspension assembly disposed between the cab and the frame remote from the hinged mounting means at the front of the cab which includes first and second air sleeve springs disposed on opposed sides of the centerline of the cab with the first spring being larger than the second and being disposed on the side of the cab centerline having the center of gravity of the cab; a frame coupling means for coupling the bottom walls of the air sleeve springs with the frame; and a cab coupling means for coupling the top walls of the air sleeve springs with the cab.

More particularly, the cab coupling means includes a latch means for releasably coupling the cab with the assembly and the system includes hydraulic means for hydraulically operating the latch means sequentially with hydraulically operating the cab between lowered and raised positions. Advantageously, a resilient stop is disposed between the cab and the suspension assembly. These stops assist to stabilize and guide the suspension when coupled to the cab. Additionally, the assembly includes means for delivering and discharging pressurized air from the springs for adjusting the elevation of the cab. Finally, the system includes bumpers and non-metallic wear pads for limiting the lateral and vertical movements of the top walls of the springs relative to their respective bottom walls.

BRIEF DESCRIPTION OF THE DRAWINGS

FIG. 1 is an elevational view partly in section of the suspension system;

FIG. 2 is an elevational view taken along line 2—2 of FIG. 1;

FIG. 3 is a partial perspective view of the suspension system coupled to the frame of the tractor and showing the cab tilted in the raised position;

FIG. 4 is a schematic representation of the hydraulic system for operating the latch and hydraulic cylinder;

FIG. 5 is a schematic representation of the pressurized air system coupled with the air sleeve springs.

DESCRIPTION OF THE PREFERRED EMBODIMENT

Suspension system 10 broadly includes suspension assembly 12, frame coupling means 14, cab coupling means 16, lower bumpers 18 and 20, upper bumpers 22 and 24, and side wear pads 26 and 28.

Referring now to FIGS. 1 and 2, suspension assembly 12 includes major air sleeve spring 30, minor air sleeve spring 32, air piping conduit 34, and shock absorber 36.

Preferred air sleeve springs 30 and 32 are conventional units manufactured by Firestone Corporation part numbers WO2-358-7014 and WO2-358-4001. Spring 30 has a nominal diameter of 5.5 inches and spring 32 has a nominal diameter of 3.1 inches. Springs 30 and 32 each include a top wall fitting 38 which further includes a threaded aperture (not shown) therein. Additionally, springs 30 and 32 include respective threaded bottom wall fitting 42 and retaining bottom wall fitting 44 which further include internally threaded apertures (not shown) communicating respectively with the interiors of springs 30, 32.

Air conduit 34 includes conventional one-quarter inch tubing 46 composed of plastic, rubber, copper or steel which is coupled respectively to springs 30 and 32 by tee 48 and elbow 50 which are threadably received in respective fittings 42 and 44. Conduit 34 is also coupled with valve 52 (FIG. 5) which in turn couples to air tank 54 conventionally provided on yard tractors for applying air operated brakes. Valve 52 is a conventional unit such as VELVAC part number 032110.

Shock absorber 36 is a conventional automotive-type shock absorber such as DEXTER part number 26178 or GABRIEL 42406.

Frame coupling means 14 includes steel channel support member 56 and a pair of steel angles 58. Angles 58 are welded on opposed sides of member 56 and extend outwardly with the outwardly extending legs bolted respectively to left and righ frame structures 60 and 62. Frame coupling means 14, thus configured, presents a yoke for supporting the lower walls of springs 30 and 32 and shock absorber 36. Bottom wall fittings 42 and 44 of springs 30 and 32 are received in channel support member 56 on opposed sides of the cab centerline. Additionally, shock absorber 36 is conventionally coupled to channel support member 56 as shown.

Cab coupling means 16 includes steel coupling channel 64, hydraulically operated latch assembly 66, and a pair of cab stops 78.

Coupling channel 64 rests on air springs 30 and 32. Conventional bolts (not shown) are disposed through respective apertures in channel 64 and are threadably received in fitting 38 thereby securely coupling channel 64 with suspension assembly 12. Additionally, coupling channel 64 receives the upper end of shock absorber 36 therethrough and includes U-shaped extension 70 which couples the upper end of shock absorber 36 to channel 64.

Latch assembly 66 includes latch 72 and latch pin 74. Latch 72 and latch pin 74 are manufactured by OR-SCHELN Company, part numbers 25007300 and 25006900. Latch 72 is conventionally bolted to the upper face of channel 64 and latch pin 74 is conventionally mounted to the cab 76 as shown in FIGS. 1 and 3 so that latch pin 74 is properly aligned normal to latch 72.

Cab stops 68 each include a channel section 78 one leg of which is welded to cab 76 and the other leg presenting a pair of resilient cylindrical rubber elements 80 bolted thereto.

Latch 72 is hydraulically operable from the latched position shown in FIG. 1 to the unlatched position whereby latch element 82 retracts and uncouples from latch pin 74. Latch 72 is hydraulically coupled with tractor cab's tilting hydraulic system 84 as schematically illustrated in FIG. 4.

Hydraulic system 84 is conventional and typically incorporated as an integral part of conventional yard tractors for moving the cab between raised and lowered positions. Hydraulic system 84 includes either a manually operated hydraulic pump or an electic motor driven hydraulic pump. In the electric motor driven pump version, an electric motor 86 is wired to the tractor's electrical system through two switches. A conventional hydraulic pump 88 is coupled to the electric motor and to a reservoir 92. Depressing a switch electrically activates the motor 86 which causes the pump 88 to pump fluid through a valve and hydraulic line 94 to hydraulic cylinder 96 which operates to raise the cab 76. A second switch activates a valve which lowers the cab.

The manual pump has a manually controlled integral valve. When the valve is turned into the designated proper position, fluid may be pumped through the valve and hydraulic line 94 to the cylinder 96 to raise the cab 76. When the valve lever is actuated to the opposite position the cab will lower from the raised position.

In suspension system 10, latch 72 is hydraulically coupled with hydraulic line 94 by hydraulic tee 98.

Identical lower bumpers 18 and 20 each includes U-shaped bracket 100 inverted and welded to the top surface of channel support member 56 on opposed sides of the cab centerline. Each bracket 100 includes a pair of rubber elements 80 bolted to the top surface thereof.

Identical upper bumpers 22 and 24 each includes Z-shaped bracket 102 with one respective legs thereof bolted to angle 58 on opposed sides of assembly 12. The other legs of brackets 102 face inwardly and each includes a pair of rubber elements 80 bolted to the bottom surface thereof. Additionally, each bracket 102 is reinforced by a pair of gussets 104 welded on opposed sides thereof.

Identical side bumpers 26 and 28 each includes a flat steel strap 106 welded respectively to opposed ends of channel support member 56. Each of straps 106 includes a pair of plastic elements bolted to the outboard side thereof.

In use, with cab 76 in the lowered and latched position as shown in FIG. 1, the driver of yard tractor 108 can adjust the height of the rearward portion of cab 76 relative to frame structures 60 and 62 by adjusting the air pressure in air sleeve springs 30 and 32. Control valve 52, which may be conveniently located in the driver's compartment of cab 76, controls the air pressure on springs 30 and 32. For example, if the driver wishes to raise the rearward portion of the cab relative to the hinged front portion, the operator adjusts valve 52 to increase the pressure on springs 30 and 32. This adjustment delivers air from tank 54 through valve 52 via conduit 34 into springs 30 and 32. The increased pressure in springs 30 and 32 raises top wall fittings 38 and 40 relative to respective bottom wall fittings 42 and 44 and thus raises the rearward portion of cab 76.

Conversely, to lower the rearward portion of cab 76, the driver reverses the operation of valve 52 which causes air pressure to vent from valve 52 via conduit 34 from springs 30 and 32.

Lower bumpers 18, 20 and upper bumpers 22, 24 limit the lower and upper travel of assembly 12 relative to frame structure 60, 62 in the event springs 30, 32 are over or under pressured or in the event tractor 108 encounters a severe bump or pothole. Additionally, side bumper 26, 28 ensure vertical alignment of assembly 12.

When it is desired to tilt cab 76 upwardly to the raised position as shown in FIG. 3, the driver moves the hydraulic operating handle of pump 88 or depresses an electrical switch connected to motor 86. By operating the electric switch, motor 86 is energized which causes hydraulic pump 88 to deliver hydraulic fluid from reservoir 92 through valve 90 and hydraulic line 94 to hydraulic cylinder 96 and latch 72. Latch 72 immediately retracts unlatching element 82 from latch pin 74 and the hydraulic pressure on cylinder 96 causes cab 76 to tilt upwardly. Even though latch 72 and hydraulic cylinder 96 are pressurized simultaneously, latch 72 sequentially retracts latching element 82 before cylinder 96 begins to exert significant lifting force due to lower operating pressure requirement. With this hydraulic configuration, operation of the hydraulic pump unlatches and tilts cab 76 upwardly thereby eliminating the need for separate unlatching and tilting operations.

When the driver desires to lower cab 76, a switch or handle is actuated in the opposite direction which causes valve 90 to release hydraulic fluid back into the reservoir 92 thereby releasing hydraulic pressure on cylinder 96. The weight of cab 76 forces fluid from cylinder 92 and allows cab 76 to lower. The configuration of latch assembly 66 is such that as pin 74 lowers and contacts the exposed portion of latch element 82, element 82 returns to the latched position as shown in FIG. 1. Thus, lowering and latching of cab 76 is also accomplished in a single convenient operation.

FIG. 3 illustrates that suspension assembly 12 along with springs 30 and 32 remain coupled with frame structure 60 and 62 when cab 76 is tilted upwardly. Additionally, latch 72 remains coupled with coupling channel 64 which eliminates the need for flexible and more expensive hydraulic lines. Only hinge pin 74 and cab stops 78 are fixedly coupled with cab 76 and these do not have moving parts. Thus, the mechanical operation and reliability of suspension system 10 is greatly improved.

As previously discussed, air sleeve spring 30 is larger than air spring 32 and is disposed on the outboard side of the centerline of cab 76. This configuration allows spring 30 to provide greater support which is needed because the outboard side of cab 76 contains the center of gravity. The extra support supplied by spring 30 compared to spring 32 maintains the lateral level of cab 76 despite the center of gravity being offset to the outboard side of the cab center-line.

Those skilled in the art will appreciate that the present invention contemplates many variations in the preferred and specific design disclosed herein. For example, major spring 30 could be replaced by two or more smaller air sleeve springs which would result in the same net effect of greater support being provided on the side of cab 76 containing the center of gravity. Additionally, it is preferred to operate springs 30 ad 32 using conventional tractor supplied air pressure and operate latch 72 using conventional tractor supplied hydraulic pressure; however, either could be configured to use air of hydraulic fluid.

Having thus described the preferred embodiment of the present invention, applicant claims the following as new and desired to be secured by Letters Patent:

1. In a yard tractor having a frame, a cab, and a cab mounting means tiltably mounting the cab to the frame for permitting shifting of the cab between raised and lowered positions, the tractor presenting a longitudinal centerline, the cab having a center-of-gravity offset to one side of the centerline, a suspension system for the tractor comprising:

a first air sleeve spring having flexible walls for containing pressurized, compressible fluid therein;
   a second air sleeve spring having flexible walls for containing pressurized compressible fluid therein; and
   spring mounting means for mounting said springs remote from the cab mounting means to one of the frame and cab for disposition therebetween when the cab is in the lowered position, and for mounting said springs on opposed sides of the centerline with said first spring on the one side of the centerline having a center-of-gravity and with the second spring on the other opposed side of the centerline, said first spring being larger than said second spring in order to compensate for the offset center-of-gravity of the cab and thereby to maintain the lateral level of the cab when in the lowered position.

2. The system as set forth in claim 1, said spring including respective top and bottom walls,
   said spring mounting means including means for coupling said bottom walls with the frame and for presenting said top walls for operative engagement with the cab when in the lowered position.

3. The system as set forth in claim 1, further including cab coupling means including shiftable latch means shiftable between a latched position for holding the cab in the lowered position and an unlatched position for allowing shifting of the cab to the raised position.

4. The system as set forth in claim 3, further including hydraulic means for hydraulically operating said latch means from said latched position to said unlatched position and for hydraulically operating the cab from said lowered position to said raised position.

5. The system as set forth in claim 4, said cab coupling means including a resilient stop disposed between the cab and said assembly.

6. The system as set forth in claim 1, each of said springs including conduit means for receiving fluid under pressure therein and for discharging fluid therefrom, said assembly including fluid control means coupled with said conduit means for selectively delivering pressurized fluid from a source thereof to said springs and for maintaining fluid under pressure within said springs, said fluid control means including means for releasing pressurized fluid from said springs.

7. The system as set forth in claim 6, said fluid including air.

8. The system as set forth in claim 1 further including means for limiting lateral movement of said top walls relative to said bottom walls.

9. The system as set forth in claim 1 further including means for limiting vertical movement of said top walls relative to said bottom walls.

* * * * *